H. R. SAXON.
LATCH FOR MOTOR VEHICLE HOODS.
APPLICATION FILED JULY 30, 1917.
1,361,622.
Patented Dec. 7, 1920.
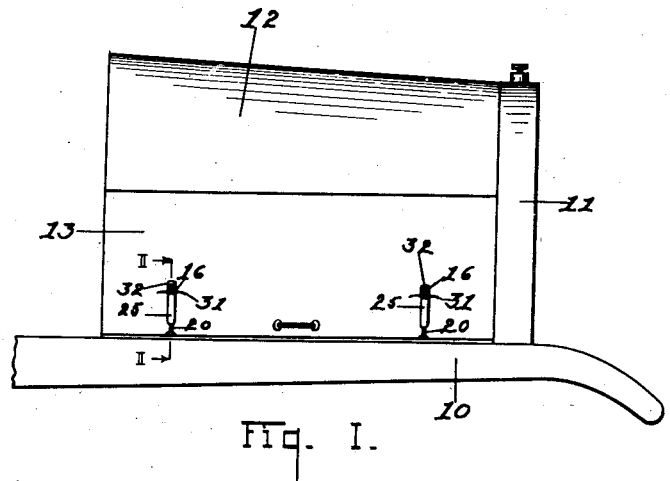
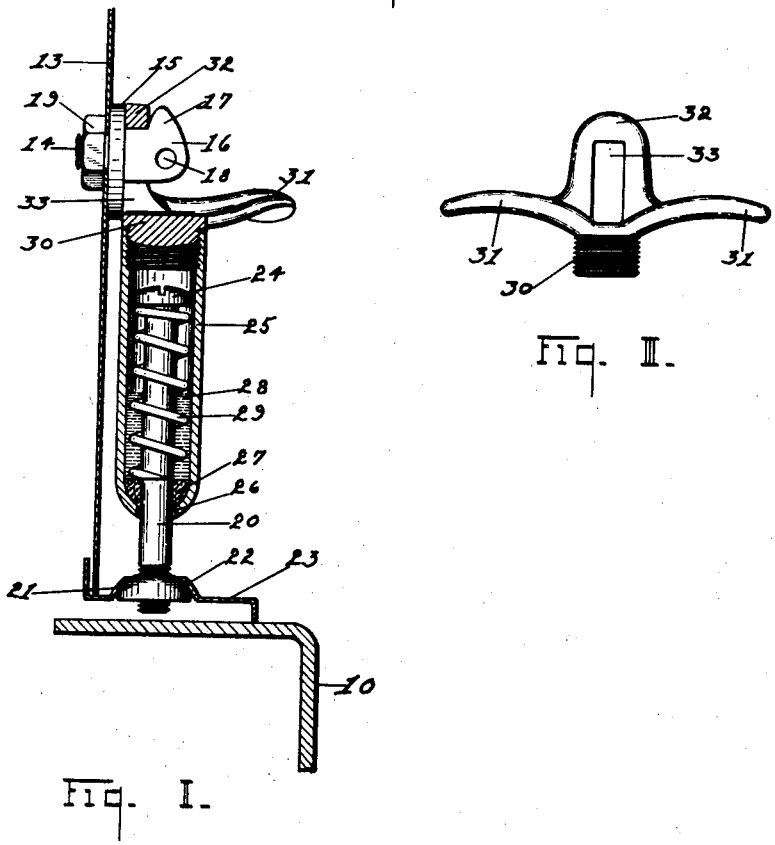
Inventor
Herman R. Saxon
By Chester H. Braselton
Attorney

UNITED STATES PATENT OFFICE.

HERMAN R. SAXON, OF TOLEDO, OHIO, ASSIGNOR, BY MESNE ASSIGNMENTS, TO INDUSTRIAL RESEARCH CORPORATION, OF TOLEDO, OHIO, A CORPORATION OF DELAWARE.

LATCH FOR MOTOR-VEHICLE HOODS.

1,361,622.  Specification of Letters Patent.  Patented Dec. 7, 1920.

Application filed July 30, 1917. Serial No. 183,509.

*To all whom it may concern:*

Be it known that I, HERMAN R. SAXON, a citizen of the United States, residing at Toledo, in the county of Lucas and State of Ohio, have invented certain new and useful Improvements in Latches for Motor-Vehicle Hoods, of which I declare the following to be a full, clear, and exact description.

This invention relates to improvements in latches for motor vehicle hoods.

The principal object of my invention is to provide an improved latch for motor vehicle hoods, which is simple and compact in appearance and which is so arranged that the working parts are not exposed so as to be affected by the weather so as to rust and stick.

Further objects, and objects relating to economies of manufacture and details of construction, will definitely appear from the detailed description to follow.

I accomplish the objects of my invention by the devices and means described in the following specification. My invention is clearly defined and pointed out in the appended claims.

A structure constituting a preferred embodiment of my invention is illustrated in the accompanying drawing, forming a part of this specification, in which—

Figure I is a view in side elevation of a part of a motor vehicle, showing a portion of the radiator and the frame, the fenders and wheels being omitted in order to make the showing of the hood more clear.

Fig. II is an enlarged, detail, sectional view, taken substantially on the line II—II of Fig. I.

Fig. III is an enlarged, detail view, in side elevation, of the head of the latch.

In the drawings, similar reference numerals refer to similar parts throughout the several views, and the sectional views are taken looking in the direction of the little arrows at the ends of the section line.

Considering the numbered parts of the drawings, the radiator 11 is mounted on the frame 10, and the hood, comprising the upper part 12 and the side parts 13, which are hinged to the upper part, is suitably mounted from the frame and the radiator. A handle is provided for lifting the side portion 13 of the hood.

My invention has to do with the latches or fastening devices for releasably fastening the side portion 13 of the hood to the frame, so as to prevent the lifting or working loose of the same. A bolt 20 has a nut 21 threaded on the lower end thereof, said nut being provided with a convex upper surface. A plate 23 is attached to the frame 10 and is provided with a concave depression struck up therefrom and with an opening therethrough, through which the bolt 20 passes, the convex nut 21 engaging the concave surface of the depression 22. The bolt 20 has the head 24 disposed within the cylindrical casing 25, said casing having an opening 26 at the lower end thereof, through which the bolt 20 passes.

A yieldable packing 27 is disposed around the bolt within the lower end of the casing and the casing is likewise partly filled with hard grease 28, so as to lubricate the parts and prevent their becoming objectionably noisy. A spring 29 is disposed between the packing 27 and the head 24 of the bolt. A head 30 is screwed into the open upper end of the casing 24, said head being provided with laterally extending finger pieces 31 and an upwardly extending ear 32 having an elongated slot 33 therein. A keeper member 16 has a threaded stem 14 extending through an opening provided in the side portion 13 of the hood and a flange 15 engaging the outer surface of the hood. The keeper is retained in place by the nut 19 threaded on the stem 14 and engaging the inner surface of the side portion 13 of the hood. The keeper member is provided with a beveled nose 17 and has a transverse opening 18 therethrough, through which a padlock or similar device may be passed to prevent the unauthorized lifting of the hood.

From the description of the parts given above, the operation of my device should be very readily understood. To release the hood, the finger pieces 31 are gripped by the fingers and the casing 25 is lifted thereby, which lifts the head portion 32 sufficiently so that the nose 17 of the keeper 16 clears the slot 33. The casing and head may then be swung laterally to free the head from said keeper. The convex nut 21 permits of a slight rocking of the latch on its support, so as to permit of this lateral swing. The latch is adjustable by means of the nut 21 threaded on the end of the bolt 20, so as to provide for an accurate engagement of the head of the latch with the keeper. The spring 29, normally tends to force the casing 25 and the head carried thereby downwardly, so as to hold it in engagement with the keeper. To fasten the hood when it is in place, the casing 25 is lifted by the finger grip, until the slot 33 is in line with the nose portion 17 of the keeper member, and the latch is then swung laterally so that the nose of the keeper passes through the slot 33 when the latch is released and the spring 29 draws it downwardly, causing the engagement of the upper edge of the slot 33 with the inclined or beveled nose 17, so that the parts are drawn tightly together. The spring is housed and out of sight, and the outer surface of the latch is smooth and sightly and may be finished so as to present an attractive appearance. The inner part of the casing 25 serves as a receptacle for holding hard grease or other lubricant, so that the latch may easily be kept lubricated and will not rust so as to squeak and become noisy. Furthermore, the working parts are all protected from the weather.

I am aware that this particular embodiment of my invention, which I have here shown and described, is susceptible of considerable variation without departing from the spirit of my invention. I have found, however, that this particular embodiment is desirable from many standpoints, and therefore, I desire to claim the same specifically, as well as broadly, as indicated by the appended claims.

Having thus described my invention, what I claim as new and desire to secure by Letters Patent is—

1. A device of the class described, comprising the combination of a casing, a bolt slidably mounted therein and projecting therefrom, a yieldable member disposed in the end of the casing through which said bolt projects to form therewith a liquid tight joint, a spring having one end seated upon said yieldable member and the other upon the head of said bolt, a relatively fixed support with which said bolt is connected, a movable plate section adjacent said relatively fixed support, a stud carried by said plate section, and means for removably connecting said casing with said stud.

2. In a device of the class described, a fixed member, a movable section, a casing, a bolt slidably mounted in the casing and pivotally secured to the fixed member, a yieldable member disposed in the end of the casing through which the bolt projects to form therewith a liquid tight joint, a spring surrounding the bolt and having one end coöperating with the yieldable member and means for removably connecting the casing with the movable section.

In testimony whereof I affix my signature.

HERMAN R. SAXON.